(12) United States Patent
Jensen et al.

(10) Patent No.: US 8,654,341 B2
(45) Date of Patent: Feb. 18, 2014

(54) INTERFEROMETRIC DISTANCE MEASURING METHOD WITH SPECTRALLY SEPARABLE DOUBLE CHIRP AND DEVICE

(75) Inventors: Thomas Jensen, Rorschach (CH); Marcel Rohner, Heiden (CH)

(73) Assignee: Leica Geosystems AG, Heerbrugg (CH)

( * ) Notice: Subject to any disclaimer, the term of this patent is extended or adjusted under 35 U.S.C. 154(b) by 397 days.

(21) Appl. No.: 12/989,256

(22) PCT Filed: May 29, 2009

(86) PCT No.: PCT/AZ2009/000002
§ 371 (c)(1),
(2), (4) Date: Nov. 12, 2010

(87) PCT Pub. No.: WO2010/000043
PCT Pub. Date: Jan. 7, 2010

(65) Prior Publication Data
US 2011/0292403 A1  Dec. 1, 2011

(30) Foreign Application Priority Data
May 28, 2008  (EP) .................................... 08104145

(51) Int. Cl.
*G01B 9/02*  (2006.01)
(52) U.S. Cl.
USPC ........................................................ 356/486
(58) Field of Classification Search
USPC .................. 356/4.09, 4.1, 482, 485, 486, 498
See application file for complete search history.

(56) References Cited

U.S. PATENT DOCUMENTS

| 4,005,936 | A | * | 2/1977 | Redman et al. ................. 356/4.1 |
| 5,153,669 | A | * | 10/1992 | DeGroot ....................... 356/489 |
| 7,139,446 | B2 | | 11/2006 | Slotwinski |
| 7,372,551 | B1 | * | 5/2008 | Delfyett et al. .............. 356/5.15 |
| 7,990,521 | B2 | * | 8/2011 | Ueno ........................... 356/4.01 |
| 2006/0126073 | A1 | | 6/2006 | Farrell et al. |
| 2006/0182383 | A1 | | 8/2006 | Slotwinski |
| 2006/0203224 | A1 | * | 9/2006 | Sebastian et al. ............. 356/4.09 |
| 2007/0189341 | A1 | | 8/2007 | Belsley |

FOREIGN PATENT DOCUMENTS

CN  101013024 A  8/2007
EP  1696201 A1  8/2006

OTHER PUBLICATIONS

R. Onodera et al, "Two-wavelength laser-diode heterodyne interferometry with one phasemeter," Opt. Lett. 20, 2502-2504 (1995).
L. Hartmann, et al "An absolute distance interferometer with two external cavity diode lasers" Measurement Science and Technology, vol. 19, No. 4, 2008.

(Continued)

Primary Examiner — Michael A Lyons
(74) Attorney, Agent, or Firm — Maschoff Brennan

(57) ABSTRACT

In a distance-measuring method, chirped laser radiation with two separable radiation components is emitted to at least one target to be surveyed and via a local oscillator path, the radiation components having an opposite chirp as a time dependency of the modulated wavelengths ($\lambda_1$, $\lambda_2$). After reception of the laser radiation scattered back from the target and passed via the local oscillator path, the laser radiation received is converted into signals and the distance to the at least one target is determined from the signals on the basis of interferometric mixing, separation of the radiation components being effected on the basis of their spectral characteristic.

17 Claims, 2 Drawing Sheets

(56) References Cited

OTHER PUBLICATIONS

K. A. O'Donriell et al, "Experimental study of scattering from characterized random surfaces," J. Opt. Soc. Am. A 4, 1194-1205 (1987).
Gareth D. Lewis, et al, "Backscatter Linear and Circular Polarization Analysis of Roughened Aluminum," Appl. Opt. 37, 5985-5992 (1998).

E. R. Méndez, et al, "Statistics of the polarization properties of one-dimensional randomly rough surfaces," J. Opt. Soc. Am. A 12, 2507-2516 (1995).
G. Soriano et al, "Scattering of electromagnetic waves from two-dimensional rough surfaces with an impedance approximation," J. Opt. Soc. Am. A 18, 124-133 (2001).
Chinese Office Action dated Aug. 17, 2011 as received in related application No. 200980118949.9.

* cited by examiner

INTERFEROMETRIC DISTANCE MEASURING METHOD WITH SPECTRALLY SEPARABLE DOUBLE CHIRP AND DEVICE

The invention relates to an interferometric distance-measuring method with spectrally separable double chirp and an interferometric distance measuring apparatus.

BACKGROUND

In the area of electronic distance measurement, various principles and methods are known. One approach consists in emitting frequency-modulated electromagnetic radiation, such as, for example light, to the target to be surveyed and then receiving one or more echoes from back-scattering objects, ideally exclusively from the target to be surveyed, it being possible for the target to be surveyed to have both a reflective—for example retroreflectors—and a diffuse backscattering characteristic.

After reception, the optionally superposed echo signal is superposed with a mixed signal and the signal frequency to be analyzed is reduced thereby so that less outlay is required with respect to the apparatus. The mixing can be effected either as a homodyne method with the signal sent or as a heterodyne method with a periodic, in particular harmonic, signal of known period. Thus, the methods differ in that mixing is effected with the transmitted signal itself or with a harmonic signal having its own frequency. The mixing serves for transforming the received signal to lower frequencies and for amplifying said signal. Thereafter, the transit times and hence—in the case of a known propagation velocity of the radiation used—the distances to the targets to be surveyed are determined from the resulting signal. In a heterodyne interferometer arrangement, a tuneable laser light source is used for the absolute distance measurement. In the embodiment which is simplest in principle, the tuning of the optical frequency of the laser source is effected linearly. The received signal is superposed with a second signal which is derived from the emitted light signal. The resulting beat frequency of the heterodyne mixed product, the interferogram, is a measure of the distance to the target object. The apparatuses used for implementing these methods usually utilize a signal generator as a chirp generator, which impresses a signal on a modulatable radiation source. In the optical range, lasers which can be chirped by modulation of the external (for example Bragg grating) or internal cavity (for example Distributed Feedback (DFB) or Distributed Bragg Reflector (DBR)) are generally used as radiation sources. In the optical range, transmitting and receiving optical systems to which a detector or quadrature detector for heterodyne mixing, A/D convertor and digital signal processor are connected downcircuit are used for emission and for reception.

An example of an optical, coherent FMCW distance-measuring method is described in U.S. Pat. No. 4,830,486, this method having an accuracy in the region of phase-measuring methods in combination with a short measuring time. A chirp generator produces a linear frequency-modulated signal which is divided into a measuring signal and local oscillator signal, the two signals being superposed in a receiver.

The change in the wavelength of the emitted light signal represents the scale of the measurement. This is generally not known and therefore has to be determined in an additional measurement. For this purpose, in the prior art, for example, a part of the emitted light is passed via a reference interferometer having a defined reference length. The change in the wavelength of the emitted light signal as a function of time can be inferred from the resulting beat product on the basis of the known reference length. If the reference length is not known or is unstable, for example owing to temperature influences, it can be determined via an additional calibration unit, for example a gas cell or a Fabry-Perot element.

EP 1 696 201 discloses such a distance-measuring method comprising emission of frequency-modulated electromagnetic radiation to at least one target to be surveyed and subsequent reception with heterodyne mixing of the radiation scattered back from the target, the radiation being passed in parallel over an interferometric reference length.

While a stationary target has a defined distance invariable as a function of time, moving or vibrating targets present some problems. A constant movement of the target leads, during tuning, to opposite Doppler shifts for the different directions of the frequency ramp. Thus, a movement leads, for example, to a positive Doppler shift on passing through an ascending frequency ramp, whereas a negative Doppler shift is produced in this case On passing through the descending ramp. By using successive ascending and descending ramps, this effect can be compensated.

However, the use of ramps following one another as a function of time, i.e., or opposite chirps of the laser radiation, also reduces the useable measuring rate by a factor of two, for example from 1 kHz to 500 Hz, i.e. to half. Moreover, this approach is based on the fact that there is a constant target velocity during the time taken for passing through the two ramps. Accelerations of the target during the measuring process or vibrations cause errors in the measured distance.

In order to eliminate this problem, U.S. Pat. No. 7,139,446 proposes using two simultaneous and opposite frequency ramps, i.e. emitting radiation having two radiation components with opposite chirp, which also avoids a reduction of the measuring rate. In order to be able to separate these radiation components with respect to measurement, the emission and detection thereof is effected with different polarization. By means of this approach, accelerations can be detected and vibrations eliminated. The separation of the two radiation components by the different polarization does however require that preservation of polarization is ensured within the setup. A setup using fibre optics therefore requires polarization-preserving fibres and is susceptible to errors in the mutual orientation of the fibres relative to one another or the design of the connections. Moreover, this approach is based on the fact that the target too has polarization-preserving properties, i.e. and the target results in no influences at all on polarization. For producing the two radiation components, two laser sources coupled in in orthogonal polarizations and two detectors oriented in orthogonal polarizations are used.

However, the use of polarized light has disadvantages in measurements to metallic surfaces. Metallic surfaces having a microroughness, as is usual in the case of technical surfaces, lead to depolarization in the case of obliquely incident light. This was investigated in detail in the prior art, both experimentally, cf. for example K. A. O'Donnell and E. R. Mendez, "*Experimental study of scattering from characterized random surfaces*", J. Opt. Soc. Am. A/Vol 4, No. 7, July 1987, pages 1194-1205, or Gareth D. Lewis et al., "*Backscatter linear and circular polarization analysis of roughened aluminum*", Applied Optics, Vol. 37, No. 25, September 1998, pages 5985-5992 and theoretically in simulations, cf. for example E. R. Mendez et al., "*Statistics of the polarization properties of one-dimensional randomly rough surfaces*", J. Opt. Soc. Am. A, Vol. 12, No. 11, November 1995, pages 2507-2516, and G. Soriano and M. Saillard, "*Scattering of electromagnetic waves from two-dimensional rough surfaces with an impedance approximation*", J. Opt. Soc. Am. A, Vol.

18, No. 1, January 2001, pages 124-133, so that a substantial limitation of the usability of the method described in U.S. Pat. No. 7,139,446, results.

The usability of interferometric distance-measuring methods of the prior art with high measuring rates, which are also suitable for surveying vibrating or moving targets, is therefore not possible or possible only under restricting conditions for metallic surfaces.

SUMMARY

It is therefore the object of the invention to provide an improved distance-measuring method with double chirp and such an apparatus.

A further object of the invention is to provide a corresponding distance-measuring apparatus comprising a simplified and more robust setup, in particular without the use of polarization-preserving fibres.

A further object of the invention is to provide a solution which permits precise distance measurements by methods with double chirp even to metallic surfaces and avoids or reduces polarization-related error effects.

These objects are achieved or the solutions further developed by the subjects of claim 1 or 9 or of the dependent claims.

The solution according to the invention is based on an interferometric distance-measuring arrangement, such as, for example, the heterodyne interferometer arrangement disclosed in EP 1 696 201. According to the invention, distinguishability between the two frequency curves is provided by a spectral separation, this either being based on chromatic filtering of the different absolute optical frequencies or wavelengths of the chirped laser sources before or during detection or, with the use of a modulator (optical frequency increase), being effected by electric filtering of the different beat frequencies of the up- and down-chirping laser sources in the detected signal.

In the case of chromatic filtering, the radiation generated has two radiation components with different absolute optical frequencies or wavelengths, which are chosen so that separation on the receiving side is possible. One embodiment uses, for producing these radiation components, two separate and oppositely tuneable laser sources, e.g. distributed feedback laser diodes, with different average wavelength or frequency, e.g. 1530 nm and 1540 nm, onto which modulation is effected with opposite frequency ramps for producing a double chirp. The radiation of these laser sources can therefore be chromatically filtered. A corresponding distance-measuring apparatus can be setup with standard single-mode fibres, preservation of polarization not being necessary, in contrast to devices of the prior art. Since separation of the radiation components is possible chromatically, for example by means of a chromatic beam splitter or optical filtering with two separate detectors or with two spectrally selective detectors, the polarization-changing behaviour of metallic target surfaces does not affect the measurements, so that undisturbed elimination of vibration influences is possible. As also described in EP 1 696 201, a reference interferogram can be recorded for both laser sources.

Electric filtering can be carried out by an analogue or digital method. In the case of analogue electric filtering, for example, high-pass and low-pass filters are used for spectral separation of the up- and down-chirping signals. In the case of digital electric filtering, the spectral separation of the different beat frequencies is effected by suitable digital filters which in terms of hardware can be integrated in ASIC or FPGA components or in terms of software can be implemented in signal processing. In the case of electric filtering, spectral separation of the signals from the two laser sources is achieved in the frequency spectrum of the detected signal by discrimination of positive and negative signal frequencies, considered relative to the modulation frequency. In this way, chromatic filtering of the laser signals is not required. This method permits in particular the use of wavelengths which are close together, so that the central carrier wavelengths of the laser sources can also be identical. In particular, it is also possible to realize an overlapping region of the tuning curves, which makes it possible to match the wavelengths of the two optical sources relative to one another. In this case, a single detector is sufficient for detection.

For both forms of implementation of signal separation, i.e. both chromatic and electric filtering, a so-called quadrature detector can also be used in the detection for simple phase determination, either electrically or optically.

BRIEF DESCRIPTION OF THE DRAWINGS

The distance-measuring method according to the invention and the distance-measuring apparatus according to the invention are described or illustrated in more detail below, purely by way of example, with reference to working examples shown schematically in the drawing. Specifically.

DETAILED DESCRIPTION

Figure 1:
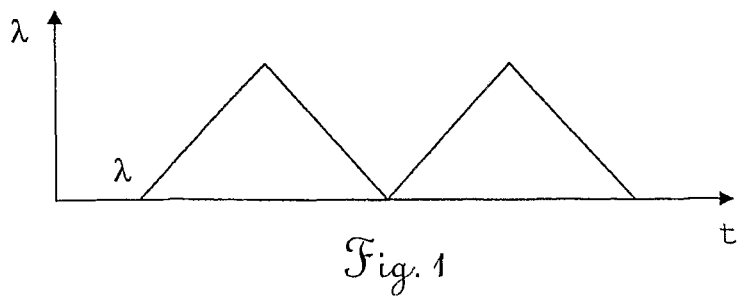
FIG. 1 shows the schematic diagram of the time dependency of the wavelength for interferometric distance-measuring methods.

FIG. 1 illustrates, in a schematic diagram, the time dependency of the wavelength for interferometric distance-measuring methods. The radiation emitted by the rangefinder is frequency-modulated by a signal generator so that ascending and descending ramps form in the variation of the wavelength $\lambda$ as a function of time. However, this modulation or emission form of the prior art produces ascending and descending ramps with a time separation, i.e. in sequence, so that the measuring rates are halved and changes within the timescale of a ramp variation or with corresponding periodicities can lead to errors.

Figure 2:
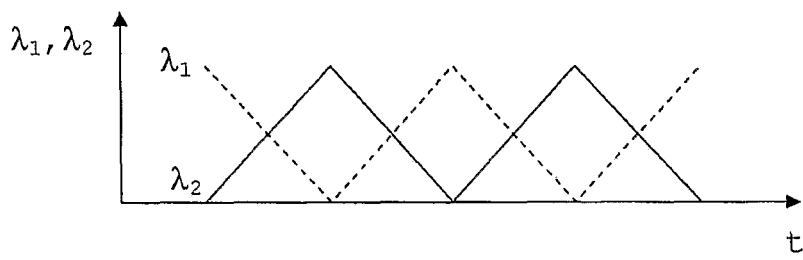
FIG. 2 shows the schematic diagram of the time dependency of the wavelength for interferometric distance-measuring methods with opposite chirp.

The prior art therefore proposes, for interferometric distance-measuring methods, the time dependency of the modulated wavelengths $\lambda_1, \lambda_2$ with opposite chirp, as shown schematically in FIG. 2. The radiation emitted to a target thus has two radiation components with different variations of the wavelength as a function of time, i.e. opposite frequency ramps. The radiation components can be emitted in particular with a phase offset of the opposite chirp of exactly 180°, i.e. strictly with the opposite phase. The depth of modulation of the radiation components may be different; in particular, it is also possible not to modulate a source—corresponding to the combination of the frequency modulation method with a classical incremental interferometer.

If both radiation components are emitted via a common optical system to a common target or are received by said optical system, separation must be permitted on the receiver side for evaluation of the two radiation components, which is solved in the prior art by different polarizations. According to the invention, the radiation components are separated on the basis of their spectral characteristic on reception and/or evaluation or determination of the distance.

Figure 3A:
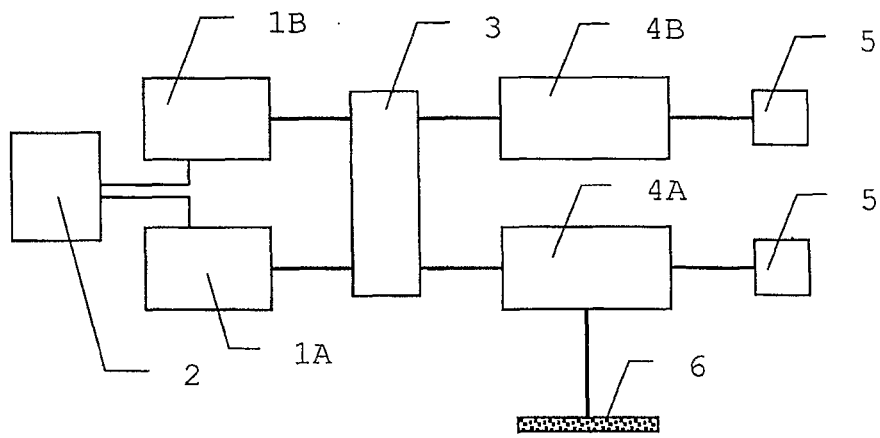
FIG. 3a-b show the schematic diagram of a first embodiment of the distance-measuring apparatus according to the invention.
Figure 3B:
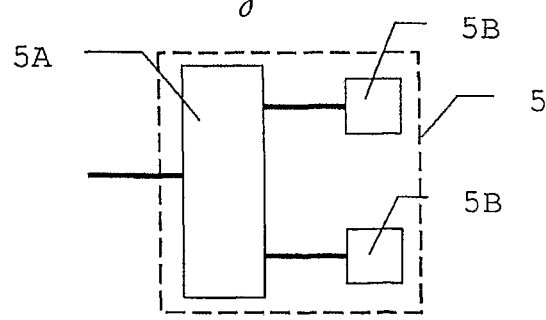

A first embodiment of the rangefinder according to the invention is shown schematically in FIG. 3a-b. The distance-measuring apparatus has a laser source for emission with at least two different average carrier wavelengths, which in the first embodiment with two modulatable beam sources 1A or 1B for producing and for emitting chirped laser radiation to a target 6 to be surveyed, a signal generator 2 impressing two opposite chirps onto the two beam sources 1A and 1B. In principle, however, the two radiation components of the laser radiation to be emitted can also be produced with the use of a single source, for example if subsequent spectral separation or downstream production of the two radiation components, for example by an optically parametric oscillator, takes place. For example, 1530 nm and 1540 nm can be chosen as carrier wavelengths. Both a common signal generator 2 and a signal generator coordinated in each case with one of the laser sources alone can be used for both beam sources 1A and 1B.

The laser radiation thus produced is coupled via a fibre coupler 3 or multiplexer, both into a measuring interferometer 4A and into a reference interferometer 4B having a defined reference length, it being possible for both interferometers to be designed, for example, as Mach-Zehnder interferometers. The interferometers each have a detector 5 for receiving the laser radiation scattered back from the target 6 or passed via the local oscillator. The reference interferometer in, for example, etalon or Mach-Zehnder configuration serves for taking into account or compensating nonlinearities in the tuning behaviour of the laser source. If the behaviour of the laser source is sufficiently linear or known and stable, it is also possible in principle to dispense with the reference interferometer. However, this is as a rule not the case. In addition to the reference interferometer, a calibration unit not shown here, in particular in the form of a gas cell or Fabry-Perot element, can also be integrated in order to determine the length of the reference interferometer. The use of such a calibration component is disclosed, for example, in EP 1 696 201.

Measuring and reference interferometers may also have a common path geometry, i.e. may have a partly common interferometer beam path for measurement or reference arm and local oscillator arm. For the measuring interferometer, the local oscillator arm is defined here by a reflection at the optical exit surface, so that a constant, in particular known distance is determined, further back-reflections being avoided. The measuring arm of the measuring interferometer is on the other hand defined by the reflection at the target to be measured. The back-reflected light of measuring arm and local oscillator arm is finally passed to a common detector in this alternative.

The setup of one embodiment of the detector 5 is shown in more detail in FIG. 3b. In addition to the fundamentally possible use of chromatically selective detectors, separation of the laser radiation may also have, for example, a dielectric or dispersive element 5A for chromatic filtering of the back-scattered laser radiation, the radiation components being passed to the detector units 5B after separation. The signal evaluation can be carried out subsequently, for example, on the basis of a heterodyne interferometric mixing method, a corresponding mixer being provided or the detector units 5B being formed as such. The laser source and the choice of the carrier wavelengths are dependent on the separability and the components which can be used on the detector side, so that the chromatic distance between the two lasers is adapted according to the separability in the detection, which is possible, for example, by a chromatic distance of 20 nm.

Figure 4:
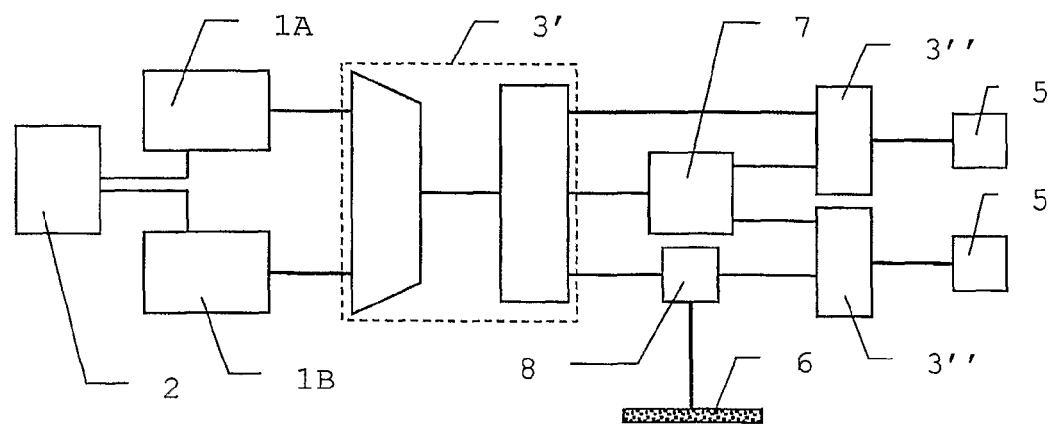
FIG. 4 shows the schematic diagram of a second embodiment of the distance-measuring apparatus according to the invention and FIG. 5 shows the diagram of a possibility for realizing the second embodiment, on the component side.

A second embodiment of the rangefinder according to the invention is shown in a schematic diagram in FIG. 4. This embodiment corresponds in the basic concept of the first embodiment but has an acousto-optical modulator 7 for raising the local oscillator of the two interferometers by the modulation frequency of the modulator 7, for example 50 MHz which facilitates the detectability. The splitting of the radiation is therefore effected via a two-part fibre coupler 3' of altogether three exits for the two interferometers and the modulator 7. At the exit of the interferometers, combination is effected again, prior to detection, by fibre coupler 3", the exit of which is connected in each case to the detector 5.

For the second embodiment, the optical system 8 used for emitting laser radiation to and receiving said laser radiation from a target 6 is shown schematically in the measuring interferometer.

Figure 5:
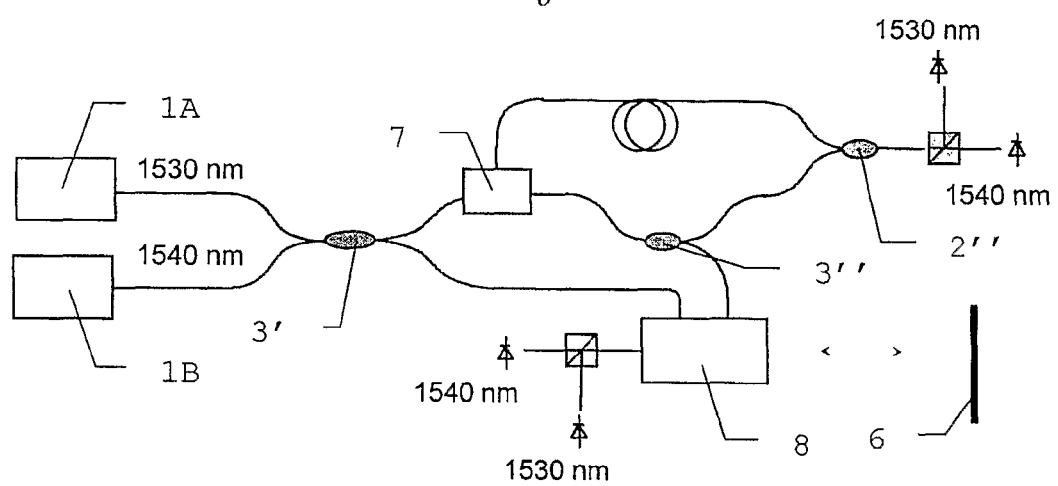

FIG. 5 shows a possibility for realizing the optical components for the second embodiment. The laser radiation is produced by two DFB laser diodes as beam sources 1A and 1B having carrier wavelengths of 1530 nm and 1540 nm, the connections between the optical components being in the form of single-mode fibres.

The laser radiation produced is coupled into the measuring interferometer, the reference interferometer and the acousto-optical modulator 7. The optical system 8 is in the form of a telescope having an at least partly common transmission and reception beam path, the target 6 to be surveyed being part of the measuring interferometer during the measurement. Via the optical paths, the signals are transmitted to the detectors with the detector units for the carrier wavelengths at 1530 nm and 1540 nm. The detector signals are then passed via electric cables to a signal processor. The signal processor performs the processing and evaluation of the signals and optionally controls the two beam sources as a signal generator via control cables.

In a third embodiment, which in principle is the same as the setup of the diagram in FIG. 4, the frequency increase of the local oscillator by, for example, 50 MHz is utilized for achieving spectral separation of the opposite chirp signals by electric filtering in the frequency spectrum of the signal. The up- and down-chirping signals appear, depending on direction, to the left and right, respectively of the central modulation frequency. By analogue or digital electric frequency filtering, the signals can easily be separated and can then be further processed as two separate detector signals. The electric filtering of the chirps in the frequency spectrum can thus be effected, for example, digitally and by means of software in the signal processing or by analogue filtering of the electrical detector signals. Since the frequency in the spectrum is determined by the chirp rate but not by the carrier wavelength of the two laser sources, the central carrier wavelengths $\lambda_1$ and $\lambda_2$ may also be identical. In this embodiment, too, it is possible completely to dispense with polarization fibres. A standard PIN diode is sufficient for detection, chromatic filtering of the detection as in FIG. 5 not being necessary.

What is claimed is:
1. A distance-measuring method comprising:
emitting a chirped laser radiation having two separable radiation components to at least one target to be surveyed and a local oscillator path, the radiation components having an opposite chirp;

receiving the laser radiation scattered back from the target and passed via the local oscillator path; and determining at least one distance to the at least one target from the signals based on interferometric mixing, wherein the radiation components are chromatically separated on reception.

2. A distance-measuring method according to claim 1, wherein the radiation components are emitted with a phase offset of the opposite chirps of 180°.

3. A distance-measuring method according to claim 1, wherein the radiation components have different depths of modulation.

4. A distance-measuring method according to claim 1, wherein the radiation components are separated on reception by discrimination of positive and negative frequencies around a modulation frequency.

5. A distance-measuring method according to claim 1, wherein the radiation components are emitted with different average carrier wavelengths.

6. A distance-measuring method according to claim 5, wherein the radiation components are separated on reception spectrally.

7. A distance-measuring method according to claim 1, wherein one of the radiation components is emitted without modulation.

8. A distance-measuring method according to claim 1, wherein, on determination of the at least one distance, a reference interferometer serves for taking into account or compensating nonlinearities in the production of the chirp.

9. A distance-measuring apparatus comprising:
a modulatable laser source for producing and for emitting laser radiation with two separable radiation components to a target to be surveyed;
a signal generator for modulation of the laser source of the radiation components with two opposite chirps; and
a receiver including:
a measuring interferometer consisting of a measuring arm and a local oscillator arm with at least one detector for receiving the laser radiation scattered back from a target; and
a mixer for carrying out a heterodyne interferometric mixing method, wherein the radiation components are chromatically separated on the receiver side.

10. A distance-measuring apparatus according to claim 9, the mixer for carrying out a heterodyne interferometric mixing including a reference interferometer for taking into account or compensating nonlinearities in the production of the chirp.

11. A distance-measuring apparatus according to claim 9, further comprising an acousto-optical modulator for raising the local oscillator of the measuring interferometer around a modulated frequency of the modulator.

12. A distance-measuring apparatus according to claim 11, wherein the separation of the radiation components is achieved by discrimination of higher and lower frequencies around the modulation frequency.

13. A distance-measuring apparatus according to claim 9, wherein the laser source has two laser diodes and with different average carrier wavelengths.

14. A distance-measuring apparatus according to claim 9, wherein the laser source has two laser diodes and wavelengths of 1530 nm and 1540 nm.

15. A distance-measuring apparatus according to claim 9, wherein the optical connections between components of the distance-measuring apparatus are in the form of single-mode fibres.

16. A distance-measuring apparatus according to claim 9, wherein the detector has two detector units for spectrally separate reception of the radiation components.

17. A distance-measuring apparatus according to claim 9, wherein the detector has a dielectric or dispersive element for chromatic separation of the back-scattered laser radiation into the radiation components.

\* \* \* \* \*

UNITED STATES PATENT AND TRADEMARK OFFICE
CERTIFICATE OF CORRECTION

PATENT NO. : 8,654,341 B2
APPLICATION NO. : 12/989256
DATED : February 18, 2014
INVENTOR(S) : Jensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this

Twenty-ninth Day of September, 2015

Michelle K. Lee
*Director of the United States Patent and Trademark Office*